(12) United States Patent
Ekomasov et al.

(10) Patent No.: US 9,110,184 B2
(45) Date of Patent: Aug. 18, 2015

(54) DEVICES FOR EXCITING SEISMIC VIBRATIONS

(71) Applicant: Sergey Petrovich Ekomasov, Moscow (RU)

(72) Inventors: Sergey Petrovich Ekomasov, Moscow (RU); Efim Grigorevich Fonbershtein, Moscow (RU); Oleg Vasilevich Podmarkov, Aleksandrov (RU)

(73) Assignee: Sergey Petrovich Ekomasov, Moscow (RU)

( * ) Notice: Subject to any disclaimer, the term of this patent is extended or adjusted under 35 U.S.C. 154(b) by 0 days.

(21) Appl. No.: 14/254,331

(22) Filed: Apr. 16, 2014

(65) Prior Publication Data

US 2014/0374188 A1     Dec. 25, 2014

Related U.S. Application Data

(63) Continuation of application No. PCT/RU2012/000796, filed on Oct. 1, 2012.

(30) Foreign Application Priority Data

Oct. 17, 2011 (RU) ................................ 2011141745

(51) Int. Cl.
*G01V 1/133* (2006.01)
*G01V 1/145* (2006.01)
*G01V 1/02* (2006.01)
*G01V 1/135* (2006.01)
(Continued)

(52) U.S. Cl.
CPC ........................................ *G01V 1/135* (2013.01)

(58) Field of Classification Search
USPC ........... 181/121, 114, 113; 367/143, 189, 144
See application file for complete search history.

(56) References Cited

U.S. PATENT DOCUMENTS

RE26,748 E  * 12/1969  Schempf ........................ 181/120
4,034,827 A  *  7/1977  Leerskov et al. .............. 181/120
(Continued)

FOREIGN PATENT DOCUMENTS

RU       2204848 C2   5/2003
SU        651281 A1   3/1979
(Continued)

OTHER PUBLICATIONS

International Search Report for PCT/RU2012/000796 dated Mar. 21, 2013.

*Primary Examiner* — Edgardo San Martin
(74) *Attorney, Agent, or Firm* — Harness, Dickey & Pierce, PLC

(57) ABSTRACT

A device for exciting seismic vibrations includes a hydraulic cylinder comprising first and second caps; a partition configured to divide the cylinder into first and second chambers; a rod and piston assembly configured to move in the first chamber; an actuator connected to a rod of the assembly; a first plate connected to the assembly and configured to move in the second chamber; a waveguide configured to move in the second chamber; and a second plate connected to the waveguide. The assembly comprises an axial through channel in a body of the assembly. The actuator is configured to move the rod of the assembly in the through channel between first and second positions. In the first position, a first flow is prevented between first and second sides of the first plate. In the second position, the first flow is allowed between the first and second sides of the first plate.

20 Claims, 2 Drawing Sheets

(51) Int. Cl.
*G01V 1/00* (2006.01)
*G01V 1/143* (2006.01)

(56) References Cited

U.S. PATENT DOCUMENTS

| | | | |
|---|---|---|---|
| 4,102,429 A * | 7/1978 | Dransfield | 181/117 |
| 5,331,607 A * | 7/1994 | Roessler | 367/189 |
| 6,464,035 B1 | 10/2002 | Chelminski | |
| 7,397,729 B2 * | 7/2008 | Guion | 367/144 |
| 8,931,587 B2 * | 1/2015 | Chelminski | 181/121 |
| 8,971,152 B2 * | 3/2015 | Chelminski | 367/144 |

FOREIGN PATENT DOCUMENTS

| | | |
|---|---|---|
| SU | 1056108 A1 | 11/1983 |
| SU | 1141359 A1 | 2/1985 |
| SU | 1728820 A1 | 4/1992 |

\* cited by examiner

DEVICES FOR EXCITING SEISMIC VIBRATIONS

CROSS-REFERENCE TO RELATED APPLICATION(S)

This application is a bypass continuation application under 35 U.S.C. §111(a) of International Application No. PCT/RU2012/000796, filed on Oct. 1, 2012, in the Receiving Office of the Federal Service for Intellectual Property of Russia (ROSPATENT), and claims the associated benefit under 35 U.S.C. §§120, 121, 363, and/or 365, and claims priority from Russian Patent Application No. 2011141745, filed on Oct. 17, 2011, in the Federal Service for Intellectual Property of Russia (ROSPATENT), the entire contents of both of which are incorporated herein by reference.

BACKGROUND

1. Field

The proposed device relates to the field of seismic prospecting of mineral deposits, more precisely, the excitation of seismic waves in the ground when conducting seismic exploratory work.

2. Description of Related Art

A device is known for exciting seismic vibrations (see Shneyerson, M. B. et al., Nazemnaya seysmorazvedka dlya vozbuzhdeniya seysmicheskikh kolebaniy (Land-based seismic prospecting with nonexplosive vibration sources), M: Nedra, p. 85), including a bushing with rod situated in a central channel of a piston, forming with the bushing a working chamber and a damping cavity. The pressure impulse in the working chamber of the device is formed by discharging into it a portion of air compressed to a pressure of 15.0 to 16.0 MPa. As a result, the air pressure in the working chamber is instantaneously raised from 0 to 3.5-4.0 MPa. The bushing in this process acts on the ground, generating a seismic wave in it, while the piston rebounds upward. The drawback of this device is the substantial operating expenses related to the use of a low-efficiency and costly high-pressure compressor to form the working agent, compressed air, which is entirely released into the atmosphere after producing the force pulse.

These drawbacks are eliminated in the device for exciting seismic vibrations (see inventor's certificate SU No. 1728820 A1 23 Apr. 1992), which can be considered as the prior art. The device includes a rod and piston assembly, and a plate fastened to its lower end, wherein an axial through channel is made in the body of the rod and piston assembly, while the piston of the rod and piston assembly is placed in the body of a hydraulic cylinder equipped with an upper cap and separated from a lower pneumatic chamber in which the plate is situated by a partition; the plate is able to interact by its lower end, forming a pneumatic gripping device, with the upper end of a stepped cylindrical waveguide, whose upper step of larger diameter is located in the pneumatic chamber, while the lower step outfitted with a working plate at its lower end forms a damping cavity with the lower cap of the pneumatic chamber.

The drawback of this device for exciting seismic vibrations is the substantial length of the interval of time from the sending of the electrical signal to unseal the pneumatic gripping device until the time of dynamic action on the ground. This interval is not sufficiently stable to ensure a synchronized operation and it does not allow an operation with a group of seismic vibration sources and signal build-up. This, in turn, substantially lowers the working effectiveness and prevents the use of this device to study cross sections at the required depths. The great length of the above-indicated interval of time is explained by the fact that a portion of compressed air delivered by valve from the pneumatic system of the device is used here for unsealing of the pneumatic gripping device (pneumatic lock). But the length and volume of the air supply channel to the pneumatic lock (including the length of the axial through channel in the body of the rod and piston assembly) are large and their filling with compressed air from the pneumatic system is extremely long.

SUMMARY

The aim of the invention is to increase the effectiveness of a device for exciting seismic vibrations by improving the synchronization of the process and the productivity.

The aim is accomplished in that, in a device for exciting seismic vibrations, in the body of the rod and piston assembly, in the part adjacent to the plate, there is a local enlargement of the axial through channel, forming a cylindrical cavity, connected by radial channels to the pneumatic chamber, a rod is disposed in the axial channel and has a sealing element fastened to its lower end, which is capable of interacting with a seat at the lower end of the cylindrical cavity, and the upper end of the rod is situated in a valve housing, rigidly attached to the upper end of the rod and piston assembly and comprised of a disk-shaped base and cap, and is equipped with a disk that is spring-loaded relative to the disk-shaped base and has a membrane which is clamped about its perimeter between the disk-shaped base and the cap, while the piston of the rod and piston assembly is stepped, and the step of smaller diameter is capable of axial displacement in the upper cap.

BRIEF DESCRIPTION OF THE DRAWINGS

The essence of the proposed invention is explained by the drawings, where.

DETAILED DESCRIPTION

Figure 1:
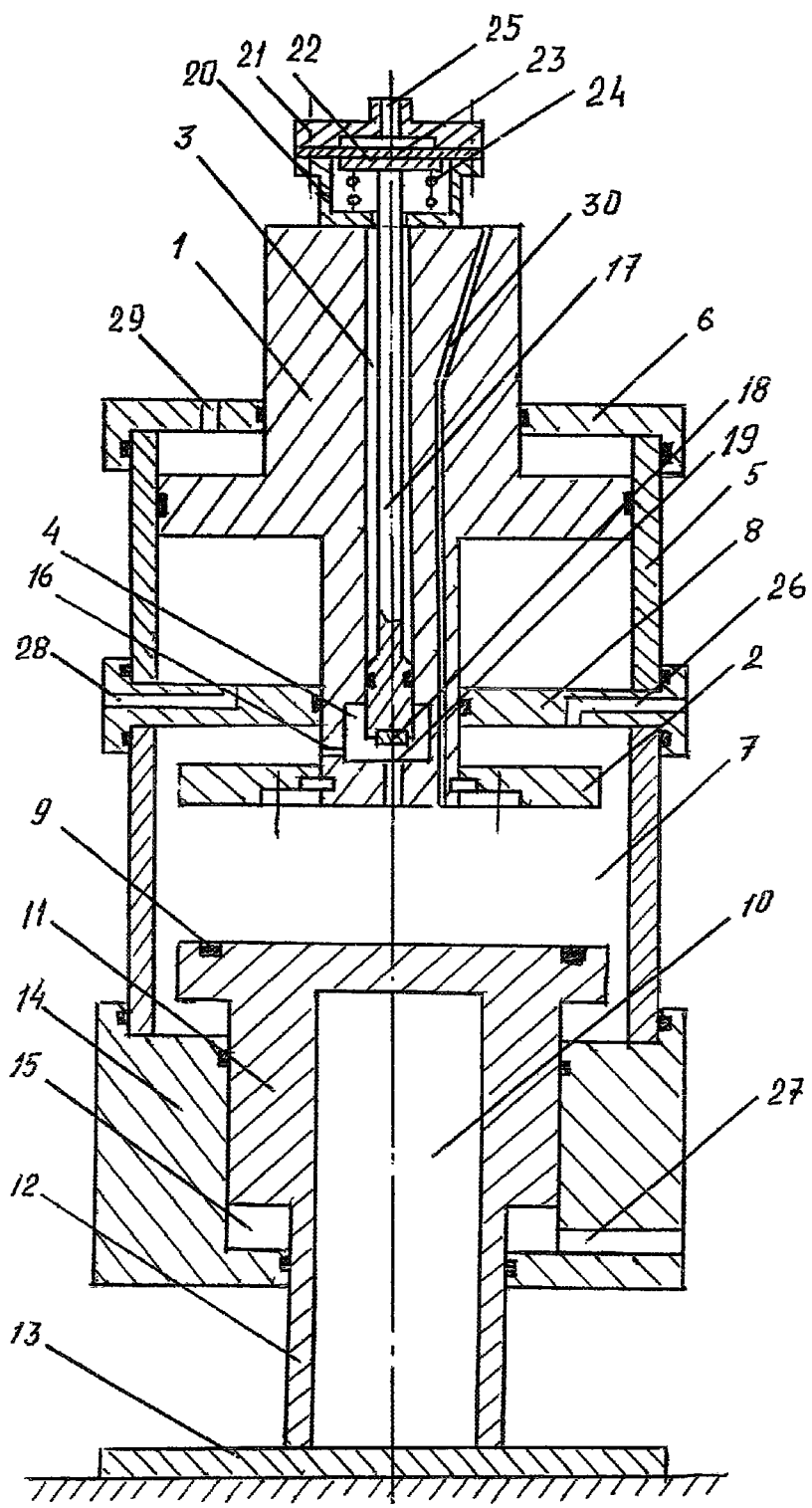
FIG. 1 shows a general view of the device before producing the working cycle.

The device includes a rod and piston assembly 1, and a plate 2 fastened to its lower end, wherein an axial channel 3 is made in the body of the rod and piston assembly 1 along its entire length and has, in the part adjacent to the plate 2, a local enlargement, forming a cylindrical cavity 4, while the piston of the rod and piston assembly 1 is placed in the body of a hydraulic cylinder 5 equipped with an upper cap 6 and separated from a lower pneumatic chamber 7 in which the plate 2 is situated by a partition 8; the plate 2 interacts by its lower end, forming a pneumatic gripping device, with the upper end of a stepped cylindrical waveguide 10, provided with a sealing ring 9, while its upper step 11 of larger diameter is located in the pneumatic chamber 7, and the lower step 12 outfitted with a working plate 13 at its lower end forms a damping cavity 15 with the lower cap 14 of the pneumatic chamber 7; the cylindrical cavity 4 is connected by radial channels 16 to the pneumatic chamber 7, a rod 17 is disposed in the axial channel 3 and has a sealing element 18 fastened to its lower end, which is capable of interacting with a seat 19 at the lower end of the cylindrical cavity 4, and the upper end of the rod 17 is situated in a valve housing, rigidly attached to the upper end of the rod and piston assembly and comprised of a disk-shaped base 20 and cap 21, and is equipped with a disk 22 that is spring-loaded relative to the base 20 and has a membrane 23 which is clamped about its perimeter between the disk-shaped base 19 and the cap 21. A spring 24 is disposed in the valve housing, and the device is outfitted with channels 25, 26, 27, 28, 29 and 30 for supplying air and working fluid.

Figure 2:
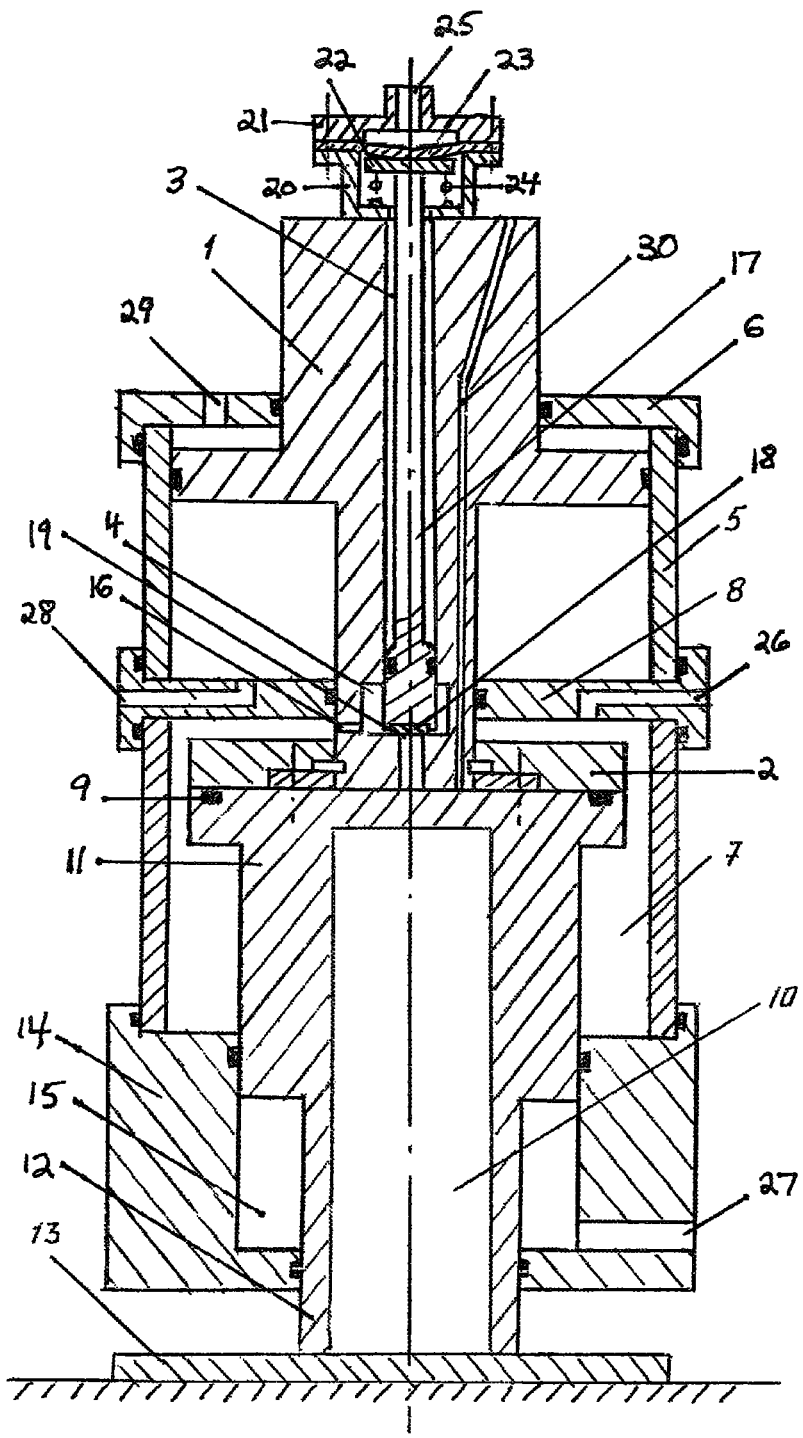
FIG. 2 shows a view of the device before performing the step of unsealing of the pneumatic lock and the subsequent dynamic action on the ground.

The device works as follows. Before performing the work, the pneumatic chamber 7 and the damping cavity 15 are filled with air to a pressure of 1.0 (10) to 1.5 (15) MPa (atm) by channels 26 and 27, respectively. After placing the device on the ground, compressed air is supplied by channel 25 from a receiver via a controlled valve (not shown in the drawing) to the cavity formed by the disk-shaped cap 21 and the membrane 23. Compressing the spring 24, the rod 17 moves downward and the sealing element 18 is seated on the seat 19. Next, the lower cavity of the hydraulic cylinder 5 is connected by channel 28 to drain, and working fluid is supplied by channel 29 to the upper cavity of the hydraulic cylinder 5, whereupon the rod and piston assembly 1 with the plate 2 descends until the plate 2 is seated on the sealing ring 9 at the end face of the waveguide 10. After this, air from the cavity between the end faces of the plate 2 and the waveguide 10, which is sealed relative to the internal volume of the pneumatic chamber 7, is released via a controlled valve (not shown in the drawing) by channel 30 in the rod and piston assembly 1 to the atmosphere, forming a pneumatic lock with a rigid chain: rod and piston assembly 1-plate 2-waveguide 10. The upper cavity of the hydraulic cylinder 5 is then connected to drain, and the working fluid under pressure is supplied by channel 28 to the lower cavity of the hydraulic cylinder 5 and the rod and piston assembly 1 with plate 2 and waveguide 10 moves to the upper position. Due to the fact that the diameter of the rod and piston assembly 1 is much less than the diameter of the upper step 11 of the waveguide 10, the pressure in the pneumatic chamber 7 rises sharply. Upon the rod and piston assembly 1 with plate 2 and waveguide 10 reaching the extreme upper position (see FIG. 2), the channel 30 is sealed by means of a controlled valve, and compressed air is discharged from the cavity between the disk-shaped cap 21 and the membrane 23 via the controlled valve to the atmosphere and the rod 17 moves upward under the action of the spring 24; air under high pressure goes via the radial channels 16 and the cylindrical cavity 4 to the pneumatic lock, unsealing it. Compressed air from the pneumatic chamber 7 acts on the end face of the waveguide 10, which exerts a dynamic action on the ground via the working plate 13, generating a seismic wave in it. At the same time, under the action of the compressed air the system of the rod and piston assembly 1-plate 2-pneumatic chamber 7-hydraulic cylinder 5 rebounds upward. After the forces of action on the waveguide 10 by the compressed air in the pneumatic chamber 7 and in the damping chamber 15 are equalized, the waveguide 10 with the working plate 13 detaches from the ground surface and for a certain time they move upward along with the other parts of the device. After rebounding, the device smoothly descends to the ground by means of a special suspension (not shown in the drawing) and the working cycle can be repeated from the moment of supplying working fluid to the upper cavity of the hydraulic cylinder 5.

Due to the small volume of the control cavity between the disk-shaped cap 20 and the membrane 23, the small stroke of the rod 17 and the slight length of the channels for transfer of compressed air from the pneumatic chamber 7 to the pneumatic lock between the end faces of the plate 2 and the waveguide 10, the unsealing time is not long. This ensures a constant time interval from the sending of the signal for unsealing the pneumatic lock till the moment of dynamic loading of the ground by the working plate 13, that is, it enables a synchronized working of the device. The stepped shape of the piston of the rod and piston assembly 1 makes it possible to reduce the time of the working cycle of the device, and thus to increase work productivity. This is due to the fact that it takes much less force for the downward movement of the rod and piston assembly 1 with the plate 2 into the pneumatic chamber 7 than for their return stroke, when the air pressure in the pneumatic chamber 7 rises sharply. The resistance to the movement of the rod and piston assembly 1 also increases. Accordingly, for the same value of nominal pressure of the working fluid, the consumption thereof in the operation of descent of the rod and piston assembly 1 can be reduced, and the time for this operation, and thus the time of the working cycle, is substantially reduced.

The invention claimed is:

1. A device for exciting seismic vibrations, including a rod and piston assembly, and a first plate fastened to a lower end of the rod and piston assembly, wherein an axial through channel is made in a body of the rod and piston assembly, while a piston of the rod and piston assembly is placed in a body of a hydraulic cylinder equipped with an upper cap and separated from a lower pneumatic chamber, in which the first plate is situated, by a partition;

the first plate is configured to interact by a lower end of the first plate, forming a pneumatic gripping device, with an upper end of a stepped cylindrical waveguide, whose upper step of larger diameter is in the pneumatic chamber, while a lower step of the cylindrical waveguide is outfitted with a working plate at a lower end of the cylindrical waveguide and forms a damping cavity with a lower cap of the pneumatic chamber;

wherein in the body of the rod and piston assembly, in a part adjacent to the first plate, there is a local enlargement of the axial through channel, forming a cylindrical cavity, connected by radial channels to the pneumatic chamber, a rod is in the axial channel and has a sealing element fastened to a lower end of the rod, which is configured to interact with a seat at a lower end of the cylindrical cavity, and an upper end of the rod is in a valve housing, rigidly attached to an upper end of the rod and piston assembly and comprised of a disk-shaped base and cap, and is equipped with a disk that is spring-loaded relative to the disk-shaped base and has a membrane clamped about a perimeter of the membrane between the disk-shaped base and the cap.

2. The device of claim 1, wherein the piston of the rod and piston assembly is stepped, and wherein a step of smaller diameter of the rod and piston assembly is configured to be axially displaced in the upper cap.

3. A device for exciting seismic vibrations, comprising:
a hydraulic cylinder comprising first and second caps;
a partition configured to divide the hydraulic cylinder into first and second chambers;
a rod and piston assembly configured to move in the first chamber;
an actuator connected to a rod of the assembly;
a first plate connected to the assembly and configured to move in the second chamber;
a waveguide configured to move in the second chamber; and
a second plate, outside the hydraulic cylinder, connected to the waveguide;
wherein the assembly comprises an axial through channel in a body of the assembly, wherein the actuator is configured to move the rod of the assembly in the axial through channel between first and second positions, wherein in the first position, a first flow is prevented between first and second sides of the first plate, and wherein in the second position, the first flow is allowed between the first and second sides of the first plate.

4. The device of claim 3, wherein a cavity of the first chamber is defined between the first cap and a piston of the assembly.

5. The device of claim 4, further comprising:
a channel configured to allow a second flow between the cavity and an exterior of the hydraulic cylinder.

6. The device of claim 3, wherein a cavity of the first chamber is defined between a piston of the assembly and the partition.

7. The device of claim 6, further comprising:
a channel configured to allow a second flow between the cavity and an exterior of the hydraulic cylinder.

8. The device of claim 3, further comprising:
a channel configured to allow a second flow between the second chamber and an exterior of the hydraulic cylinder.

9. The device of claim 3, wherein a damping cavity is defined between the waveguide and the second cap.

10. The device of claim 9, further comprising:
a channel configured to allow a second flow between the damping cavity and an exterior of the hydraulic cylinder.

11. The device of claim 3, wherein the waveguide comprises first and second sections.

12. The device of claim 11, wherein a diameter of the first section is greater than a diameter of the second section.

13. The device of claim 12, wherein a damping cavity is defined between the first section and the second cap.

14. The device of claim 13, further comprising:
a channel configured to allow a second flow between the damping cavity and an exterior of the hydraulic cylinder.

15. The device of claim 3, wherein the actuator is outside the hydraulic cylinder.

16. The device of claim 3, wherein the actuator comprises:
a membrane;
a disk connected to the membrane; and
a spring connected to the disk.

17. The device of claim 3, wherein the axial through channel comprises a local enlargement at an end of the axial through channel near the first plate.

18. The device of claim 3, wherein in the first position, a sealing element of the rod interacts with a seat of the assembly to prevent the first flow between the first and second sides of the first plate.

19. The device of claim 3, wherein the device is configured to form a pneumatic lock between the first plate and the waveguide when the rod is in the first position.

20. The device of claim 3, wherein the device is configured to release a pneumatic lock between the first plate and the waveguide when the rod is in the second position.

* * * * *